United States Patent [19]

Wada et al.

[11] 3,928,687

[45] Dec. 23, 1975

[54] PROCESS FOR THE PRODUCTION OF MODIFIED POLYPROPYLENES

[75] Inventors: Shozo Wada, Zushi; Makoto Yoda; Takashi Uchiyama, both of Oi, all of Japan

[73] Assignee: Toa Nenryo Kogyo Kabushiki Kaisha, Tokyo, Japan

[22] Filed: Mar. 14, 1972

[21] Appl. No.: 234,640

[30] Foreign Application Priority Data

Mar. 16, 1971 Japan.............................. 46-14066

[52] U.S. Cl. .......... 428/461; 260/42.15; 260/42.17; 260/42.18; 260/42.45; 260/878; 204/159.17; 428/290; 428/392
[51] Int. Cl.² .................... C08K 7/14; C08L 23/26
[58] Field of Search...... 260/878, 41 AG, 41, 42.15, 260/42.45, 42.17, 42.18; 161/216; 204/159.17

[56] References Cited
UNITED STATES PATENTS

| | | |
|---|---|---|
| 3,277,036 | 10/1966 | Whitworth et al.................... 260/23 |
| 3,425,895 | 2/1969 | Mertzweiller et al............... 161/204 |
| 3,437,550 | 4/1969 | Paul................................ 260/41 AG |
| 3,441,543 | 4/1969 | Heilman........................... 260/78.5 |
| 3,766,135 | 10/1973 | Yamanouchi et al........... 260/878 R |

FOREIGN PATENTS OR APPLICATIONS 1,964,538    6/1970    Germany

*Primary Examiner*—James H. Derrington
*Attorney, Agent, or Firm*—Wendroth, Lind & Ponack

[57] ABSTRACT

The present invention relates to a process for the production of modified polypropylenes having a good adhesiveness to inorganic fibers and metals. The process is characterized by heating crystalline polypropylene and one or more of alicyclic carboxylic acids having a cis form double bond in the ring and their anhydrides in the presence of a radical producing agent.

9 Claims, No Drawings

3,928,687

PROCESS FOR THE PRODUCTION OF MODIFIED POLYPROPYLENES

BRIEF SUMMARY OF THE INVENTION

The present invention relates to a process for producing modified polypropylenes having a good adhesiveness to inorganic fibers and metals in a simple, efficient and relatively inexpensive fashion heretofore unknown.

Inorganic fibers such as e.g., glass fibers and asbestos have been used for the purpose of raising the mechanical properties of various thermosetting resins such as unsaturated polyester resins and epoxy resins and, in recent years, for the purpose of increasing the mechanical properties of thermoplastic resins such as polyamide resins, polycarbonate resins and polypropylene resins.

In inorganic fiber reinforced synthetic resin compositions, the adhesiveness of an inorganic fiber to a synthetic resin greatly affects the mechanical properties of their composition, as is well known. The adhesiveness of a synthetic resin and inorganic fiber depends largely on the variety of the synthetic resin used, the variety of the inorganic fiber used and their surface states. Thermosetting resins such as unsaturated polyester resins and epoxy resins which have practically been used for a long time, and synthetic resins having polar groups in the molecule such as polyamide resins, which have lately become popular, are relatively excellent in adhesiveness to inorganic fibers, but synthetic resins having no polar groups in the molecule such as polypropylene and polyethylene are of too poor adhesiveness to inorganic fibers to be put to practical use.

It has been proposed to increase the adhesiveness of an inorganic fiber to synthetic resins by treating the surface of the inorganic fiber with a silane compound. This method can favourably be effected with resins having polar groups in the molecule such as unsaturated polyester resins, epoxy resins, polyamide resins, polycarbonate resins and vinyl chloride resins but no sufficient adhesive strength is given in the case of using, in combination, resins having no polar groups in the molecule such as polyethylene and polypropylene.

Thus the art is seeking ways to improve the adhesiveness of a synthetic resin having no polar groups in the molecule to inorganic fibers by incorporating therein polar groups. In U.S. Pat. No. 3,437,550, for example, there is disclosed a composition comprising an inorganic fiber reinforcing phase and a crystalline polypropylene matrix phase, the fibers of said fiber phase being coated with the product obtained by reacting a silane having at least one substituent reactive with the inorganic fibrous material and at leat one acid reactive organic substituent with crystalline polypropylene modified by addition thereof of an $\alpha,\beta$-ethylenically unsaturated acid or anhydride such as acrylic acid or maleic anhydride. However, this composition is insufficient in mechanical strength to enlarge the use of polypropylene-inorganic fiber compositions.

It is an object of the present invention to provide a novel and efficient process for producing modified polypropylenes which have a high adhesiveness to inorganic fibers.

It is another object of the present invention to produce modified polypropylene, which is suitable for use in the production of an inorganic fiber reinforced polypropylene composition.

It is a further object of the invention to increase the adhesiveness of polypropylene to inorganic fibers, in particular, glass fibers in a simple and economical manner, whereby to improve the mechanical properties of their compositions.

DETAILED DESCRIPTION OF THE INVENTION

We, the inventors, have found as a result of various studies to obtain a polypropylene-inorganic fiber composition excellent in mechanical strength that polypropylene modified by addition thereto of an alicyclic carboxylic acid having a cis form double bond in the ring or its anhydride without the use of the $\alpha,\beta$-ethylenically unsaturated acid exhibits a good adhesiveness to inorganic fibers and metals, and a composition comprising the modified polypropylene and inorganic fibers has excellent mechanical properties.

More specifically the present invention provides a process for the production of modified polypropylenes, characterized by heating crystalline polypropylene and one or more of alicyclic carboxylic acids each having a cis form double bond in the ring and their anhydrides in the presence of a free radical producing agent.

As the alicyclic carboxylic acid having a cis form double bond in the ring or anhydride, any compound capable of being added to polypropylene by a suitable radical reaction initiator may be used, for example, cis-4-cyclohexene-1,2-dicarboxylic anhydride (tetrahydrophthalic anhydride), cis-4-cyclohexene-1,2-dicarboxylic acid (tetrahydrophthalic acid), endo-bicyclo [2,2,1] -5-heptene-2,3-dicarboxylic anhydride (Trade Name: Himic anhydride, Endic anhydride), endo-bicyclo [2,2,1] -5-heptene-2,3-dicarboxylic acid (Trade Name: Himic acid, Endic acid) and methyl-endo-bicyclo[2,2,1]-5-heptene-2,3-dicarboxylic acids and their anhydrides.

The modified polyproylene according to the invention can readily be obtained by adding one or more of the above mentioned organic compounds to crystalline polypropylene and heating the mixture in the presence of a radical producing agent. The radical producing agent includes, in this specification, not only organic peroxides and diazo compounds, but also high energy ionizing radiations such as ultraviolet rays and electron ray. Illustrative of the organic peroxide are benzoyl peroxide and di-tert-butyl peroxide. The addition reaction according to the invention is ordinarily carried out by adding the above mentioned peroxide and one or more alicyclic carboxylic acids having a cis form double bond in the molecule or their anhydrides to a solution of polypropylene in an organic solvent or a suspension of polypropylene in an organic solvent or water or molten polypropylene, followed by heating. During the same time, the heating temperature has to be varied with the reaction system, reaction time and color of product. In the case of carrying out the reaction in a solution using benzoyl peroxide, the temperature is 40°–180°C, preferably 80°–140°C and in the case of carrying out the reaction in a molten state, the temperature is 170°–280°C, preferably 180°–220°C.

Although the reaction mechanism between polypropylene and the foregoing organic compound having a cis form double bond is not clear, it is assumed that the hydrogen atom bonded to the tertiary carbon in the main chain of polypropylene is pulled out readily by a radical to thus form the polypropylene radical, which is then subject to the addition reaction according to the following:

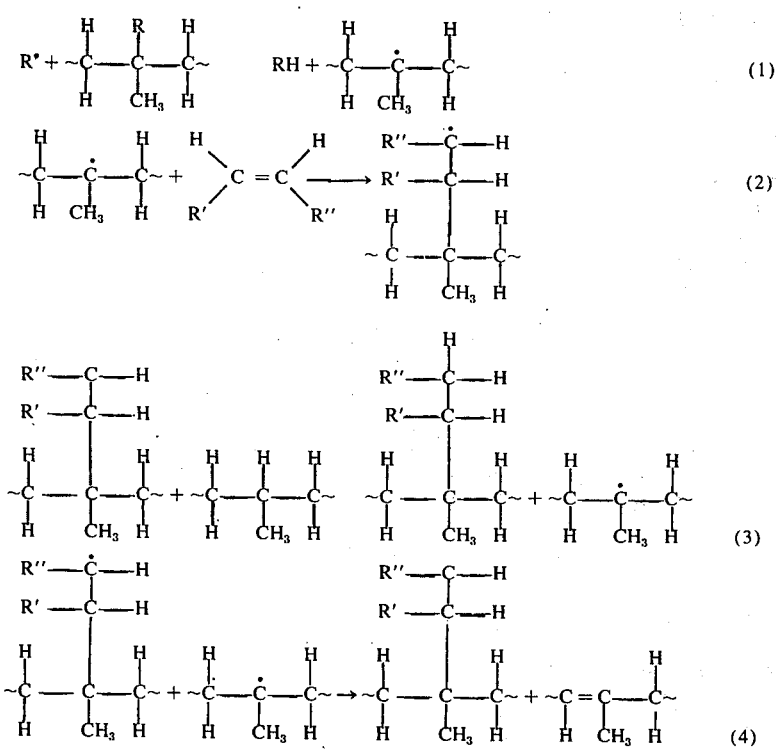

Therefore, a compound to be added to polypropylene in the formula (2) should be of cis form. Otherwise the reaction represented by the formula (2) does not proceed, because, in the case of trans form unsaturated bond, the polypropylene radical cannot approach the unsaturated bond so as to be added thereto due to the steric hindrance of the substituent R' or R'' bonded to the unsaturated carbon, which is ordinarily large in the present invention because of having a carboxyl group or its anhydride.

The modified polypropylene obtained according to the invention exhibits an excellent adhesiveness to inorganic fibers and metals because of having a carboxyl group or its anhydride in the molecule. Furthermore, the use of inorganic fibers, in particular, glass fibers, the surfaces of which are treated with an organo silane compound having amino group, epoxy group or vinyl group, results in an even greater increase in adhesiveness through the reaction with the carboxyl group or its anhydride incorporated in the modified polypropylene according to the invention. Typical of the silane compound available for the surface treatment of inorganic fibers are N-β-(aminoethyl)-γ-aminopropyltrimethoxysilane, N-(dimethoxymethylsilylpropyl)-ethylenediamine, γ-aminopropyltriethoxysilane, β-(3,4-epoxycyclohexyl)-ethyltrimethoxysilane, β-(3,4-epoxycyclohexyl)-ethyltrimethoxysilane and γ-glycidoxypropyltrimethoxysilane. The surface treatment of inorganic fibers, in particular, glass fibers with such organo silane compound may be carried out in conventional manner. Of course, commercially available glass fibers which are previously subjected to surface treatment with such organo silane compound may be used as they are.

The form of inorganic fibers, in particular, glass fibers may be chosen from the so-called roving, chopped strand, chopped strand mat and glass cloth, depending on the object of use of the modified polypropylene - inorganic fiber composition. Addition or mixing of inorganic fibers may be carried out by a suitable method depending on the form thereof.

The carboxyl group or anhydride incorporated in the modified polypropylene is readily reacted with the functional group such as amino group, epoxy group or hydroxyl group on the surface of inorganic fiber treated with an organo silane at a temperature at which the modified polypropylene is fused, to thus form a strong chemical bond between the inorganic fiber surface and modified polypropylene. When the modified polypropylene powder of the invention is dry blended with glass fiber chopped strands and then mixed and pelletized by means of an extruder, for example, the polypropylene and glass fibers are chemically bonded during the melt blending in the extruder. As occasion demands, our composition may be formed in situ by dry blending polypropylene powder with an alicyclic carboxylic acid having a cis form double bond in the ring or its anhydride used in the invention, a peroxide and inorganic fibers treated with an organo silane compound, and then passing through an extruder, or by feeding the thus dry blended mixture directly to an injection molding machine whereby the chemical bond is formed between the modified polypropylene and inorganic fiber in a molten state during the molding. In cases where the modified polypropylene of the invention is caused to adhere to metals, a similar method may be applied, for example, by dry blending polypropylene powder with an alicyclic carboxylic acid having a cis form double bond in the ring or its anhydride used in the invention, and a peroxide, feeding the resulting mixture directly to an injection molding machine where it is rendered molten and injecting the melt to the surface of an object metal.

Moreover, the modified polypropylene obtained according to the invention may with similar results be used in admixture with the ordinary polypropylene or other polyolefins.

Other features and advantages of the invention are summarized below:

1. The modified polypropylene of the invention can be dyed well, in particular, with basic dyes. Such excellent dyeing property does not result in deterioration of other properties.

2. Coating or printing can be applied to a molding of the modified polypropylene of the invention with a high stripping strength of paints or printing inks.

3. Chemical plating and electroplating can readily be applied to a molding of the modified polypropylene of the invention without any surface roughening treatments.

4. The modified polypropylene of the invention is suitable for use in the production of glass fiber reinforced composition as well as in the treatment of glass fibers so as to be used for reinforced thermoplastics.

5. Application of various adhesives to a molding of the modified polypropylene of the invention can well be done with a high adhesive strength.

The present invention will now be illustrated by the following several illustrative examples, in which parts are by weight otherwise indicated.

EXAMPLE 1

100 parts of crystalline polypropylene having a melt index of 4.0 and a certain amount of endo-bicyclo[2,2,1]-5-heptene-2,3-dicarboxylic anhydride were dissolved in 1000 parts of chlorobenzene, heated at 120°C in a stream of nitrogen, mixed with 1 part of benzoyl peroxide, stirred at that temperature for 2 hours and upon cooling, the precipitated polymer was isolated by filtering, washed with acetone and dried. Thus modified polypropylenes were obtained, to which 0.06, 0.12 and 0.24 % by weight of endo-bicyclo[2,2,1]-5-heptene-2,3-dicarboxylic anhydride were respectively added.

To 80 parts of each of the thus obtained three modified polypropylenes was added 20 parts of glass fiber chopped strands (400 glass fibers of 13 microns in diameter being bundled and chopped in a length of 6 mm) surface-treated with γ-aminopropyltriethoxy silane and kneaded in a Brabender for 5 minutes at 210°C and 15 rpm. The mixture was then subjected to a hot press under 100 kg/cm² at 200°C to prepare a test piece of 0.3 mm in thickness and the tensile strength thereof was measured, giving the following results:

| Test No. | Amount of endo-bicyclo-[2,2,1]-5-heptene-2,3-dicarboxylic anhydride added to polypropylene (wt %) | Tensile strength (kg/cm²) |
|---|---|---|
| 1 (for comparison) | 0 | 350 |
| 2 | 0.06 | 457 |
| 3 | 0.12 | 483 |
| 4 | 0.24 | 555 |

EXAMPLE 2

Following a procedure similar to that of Example 1, modified polypropylenes were obtained to which 0.06 mol % of endo-bicyclo[2,2,1]-5-heptene-2,3-dicarboxylic anhydride, cis-4-cyclohene-1,2,-dicarboxylic anhydride and maleic anhydride were respectively added.

To 80 parts of each of the thus obtained modified polypropylenes was added 20 parts of the glass fiber chopped strands used in Example 1 followed by measuring the tensile strength in a manner similar to Example 1. On the other hand, a sheet of 2 mm in thickness was prepared by a hot press and subjected to measurement of the thermal deformation temperature at a load of 18.6 kg/cm².

As evident from the results tabulated below, the modified polypropylenes to which endo-bicyclo[2,2,1]-5-heptene-2,3-dicarboxylic anhydride and cis-4-cyclohexene-1,2-dicarboxylic anhydride were respectively added, according to the invention compared favorably to that to which maleic anhydride was added, the use of which is well known.

| Test No. | Kind of Acid | Tensile strength (kg/cm²) | Thermal deformation temp (°C) |
|---|---|---|---|
| 5<br>6 (for comparison) | no | 350 | 50 |
|  | maleic anhydride | 420 | 77 |
| 7 | endo-bicyclo[2,2,1]-5-heptene-2,3-dicarboxylic anhydride | 523 | 95 |
| 8 | cis-4-cyclohexene-1,2-dicarboxylic anhydride | 510 | 93 |

EXAMPLE 3

1000 parts of crystalline polypropylene powder having a melt index of 2.0, 10 parts of endo-bicyclo[2,2,1]-5-heptene-2,3-dicarboxylic anahydride and 3 parts of ditert-butyl peroxide were mixed at normal temperature by means of a Henshell mixer. 250 parts of glass fibers surface treated with N-β-(aminoethyl)-γ-aminopropyltrimethoxy silane was added thereto, blended by a V-type blender, fed to an extruder and then extruded at 200°C to obtain a modified polypropylene, from which cylindrical pellets having a diameter of 2 mm and length of 3 mm were then prepared. On the other hand, 100 parts of crystalline polypropylene and 25 parts of the above mentioned glass fibers only were blended and similar pellets were prepared for comparison. Test pieces were then prepared from both the pellets by a procedure similar to that of Example 1 and their tensile strength and thermal deformation temperature were compared. Results of testing these test pieces are shown in the following, wherein it is apparent that the modified polypropylene of the invention gives better results.

| Test No. | Amount of endo-bicyclo-[2,2,1-]5-heptene-2,3-dicarboxylic anhydride added to polypropylene (wt %) | Tensile strength (kg/cm²) | Thermal deformation temp. (°C) |
|---|---|---|---|
| 9 | 0.22 | 613 | 99 |
| 10 (for comparison) | 0 | 362 | 51 |

EXAMPLE 4

To a mixture of 1000 parts of crystalline polypropylene having a melt index of 2.0 and 10 parts of endo-bicyclo[2,2,1]-5-heptene-2,3-dicarboxylic acid were added 2 parts and 10 parts of di-tert-butyl peroxide respectively, and the resultant composition was mixed at normal temperature by a Henshell mixer, fed to an extruder and then extruded at 200°C to obtain modified polypropylenes from which cylindrical pellets each having a diameter of 2 mm and length of 3 mm were prepared. In these modified polypropylenes, 0.11 % and 0.66 % by weight of the anhydrous dicarboxylic acid were added respectively.

40 parts of asbestos (Canadian chrysotile 4T-104) was added to 60 parts of the resulting modified polypropylenes and kneaded at 210°C for 5 minutes. Sheets of 2 mm in thickness were prepared by a hot press, the thermal deformation temperature thereof being measured at a load of 18.6 kg/cm².

On the other hand, using unmodified crystalline polypropylene for comparison, a sheet of 2 mm in thickness was prepared by a hot press and the thermal deformation temperature was measured in a similar manner. Results are shown in the following, wherein it is apparent that the modified polypropylenes according to the invention give better results.

| Test No. | Amount of endo-bicyclo [2,2,1]-5-heptene-2,3-dicarboxylic acid added to polypropylene (wt %) | Thermal deformation temperature (°C) |
| --- | --- | --- |
| 11 | 0.11 | 93.0 |
| 12 | 0.66 | 109.5 |
| 13 (for comparison) | 0 | 83.5 |

EXAMPLE 5

20 parts of glass fiber chopped strands not treated with an organo silane was added to 80 parts of a modified polypropylene to which 0.22 % by weight of endo-bicyclo [2,2,1]-5-heptene-2,3-dicarboxylic anhydride had been added by the same method as that of Example 4 except that 3 parts of di-tert-butyl peroxide was used, and the resultant composition was blended by means of a V-type blendor, fed to an extruder and then extruded at 200°C to form a cylindrical pellet having a diameter of 2 mm and length of 3 mm, followed by measurement of the tensile strength in a manner similar to that of Example 1.

On the other hand, another pellet was similarly prepared from unmodified polypropylene and then subjected to measurement of the tensile strength in a similar manner.

As is evident from the following results, the modified polypropylene of the invention is effective also for glass fibers not treated with organo silane compounds.

| Test No. | Amount of endo-bicyclo [2,2,1]-5-heptene-2,3-dicarboxylic anhydride added to polypropylene (wt %) | Tensile strength (kg/cm²) |
| --- | --- | --- |
| 14 | 0.22 | 311 |
| 15 (for comparison) | 0 | 276 |

EXAMPLE 6

Using the modified polypropylenes to which 0.11 % and 0.66 % by weight of endo-bicyclo[2,2,1]-5-heptene-2,3-dicarboxylic anhydride had been respectively added as in Example 4, a laminate of about 3 mm in thickness, consisting of a metal sheet — modified polypropylene — metal sheet, was prepared and the adhesive force was measured. The measurement of the adhesive force was carried out by measuring the shearing force on an adhered area 1 cm × 1 cm according to the measurement method of JAS on ordinary plywood, thus obtaining the following results. On the other hand, preparation of another laminate from unmodified crystalline polypropylene for comparison was not successful due to the low adhesive force.

| Test No. | Amount of endo-bicyclo[2,2,1]-5-heptene-2,3-dicarboxylic anhydride added to polypropylene (wt %) | Kind of metal | Adhesive shearing force on 1 cm × 1 cm (kg) |
| --- | --- | --- | --- |
| 16 | 0.11 | aluminum sheet | 11.5 |
| 17 | 0.11 | galvanized sheet iron | 8.6 |
| 18 | 0.66 | aluminum sheet | 11.0 |
| 19 | 0.66 | copper sheet | 14.1 |

EXAMPLE 7

To 500 ml of water were added 150 g of crystalline polypropylene having a melt index of 10, 5 g of benzoyl peroxide, 0.1 g of sodium lauryl sulfate, 1.5 g of sodium polyacrylate and 5.0 g of sodium phosphate, and the resultant composition was permitted to react in oxygen for 4 hours and cooled to 60°C. 25 g of a mixture of methyl-endo-bicyclo[2,2,1]-5-heptene-2,3-dicarboxylic anhydrides

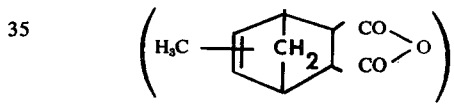

was added thereto, reacted at 60°C in a stream of nitrogen for 3 hours and, after the reaction, the product was washed and dried to obtain a modified polypropylene in which 0.45 % by weight of the carboxylic acid was incorporated.

To 6.4 parts of the so obtained modified polypropylene were added 25.6 parts of unmodified crystalline polypropylene and 8.0 parts of glass fiber chopped strands surface-treated with N-β-(aminoethyl)-γ-aminopropyltrimethoxy silane used in Example, 3, the resultant composition was kneaded at 210°C for 5 minutes and the mixture was hot pressed at 200°C under 100 kg/cm², to prepare a test piece of 0.3 mm in thickness which was subjected to measurement of the tensile strength, and to prepare a sheet of 2 mm in thickness which was subjected to measurement of the thermal deformation temperature at a load of 18.6 kg/cm².

It is evident from the following table that better results are also obtained when the modified polypropylene of the invention is mixed with the unmodified crystalline polypropylene having a melt index of 2.0 used in Example 1.

| Test No. | Amount of modified polypropylene added (%) | Tensile strength (kg/cm²) | Thermal deformation tem (°C) |
| --- | --- | --- | --- |
| 20 | 25 | 546 | 112 |
| 21 | 0 | 350 | 50 |

What is claimed is:

1. A process for the production of a modified polypropylene, which comprises heating a crystalline polypropylene with at least one member selected from the group consisting of cis-4-cyclohexene-1,2-dicarboxylic acid, endo-bicyclo[2,2,1]-5-heptene-2,3-dicarboxylic acid, methyl-endo-bicyclo[2,2,1]-5-heptene 2,3-dicarboxylic acids and their anhydrides in the presence of a free radical producing agent.

2. The process of claim 1, wherein the free radical producing agent is an organic peroxide, diazo compound or high energy ionizing radiation.

3. The process of claim 2, wherein the organic peroxide is selected from the class consisting of benzoyl peroxide and di-tert-butyl peroxide.

4. The process of claim 1, wherein the heating is carried out at a temperature of 40°–180°C in the presence of benzoyl peroxide.

5. A composition comprising inorganic fibers or metal fibers and a modified polypropylene produced by a process which comprises heating a crystalline polypropylene with at least one member selected from the group consisting of cis-4-cyclohexene-1,2-dicarboxylic acid, endo-bicyclo[2,2,1]-5-heptene-2,3-dicarboxylic acid, methyl-endo-bicyclo[2,2,1]-5-heptene-2,3-dicarboxylic acids and their anhydrides in the presence of a free radical producing agent.

6. The composition of claim 5, wherein the inorganic fibers are glass fibers or asbestos.

7. A composition comprising (1) inorganic fibers which have been treated with an organo silane compound having an amino group, an epoxy group or a vinyl group and (2) a modified polypropylene produced by a process which comprises heating a crystalline polypropylene with at least one member selected from the group consisting of cis-4-cyclohexene-1, 2-dicarboxylic acid, endo-bicyclo[2,2,1]-5-heptene-2,3-dicarboxylic acid, methyl-endo-bicyclo[2,2,1]-5-heptene-2,3-dicarboxylic acids and their anhydrides in the presence of a free radical producing agent.

8. The composition of claim 7, wherein the organo silane compound is selected from the group consisting of N-β-(aminoethyl)-γ-aminopropyltrimethoxy silane, N-(dimethoxymethylsilylpropyl)-ethyllenediamine, γ-aminopropyltriethoxy silane, β-(3,4-epoxycyclohexyl)-ethyltrimethoxy silane and γ-glycidoxypropyltrimethoxy silane.

9. A laminate comprising at least two metal sheets bonded to each other with a modified polypropylene produced by a process which comprises heating a crystalline polypropylene with at least one member selected from the group consisting of cis-4-cyclohexene-1,2-dicarboxylic acid, endobicyclo[2,2,1]-5-heptene-2,3-dicarboxylic acid, methyl-endobicyclo[2,2,1]-5-heptene-2,3-dicarboxylic acids and their anhydrides in the presence of a free radical producing agent.

* * * * *